United States Patent
Kim et al.

(10) Patent No.: US 7,274,733 B2
(45) Date of Patent: Sep. 25, 2007

(54) XDSL MODEM HAVING ADAPTIVE COMPENSATING FILTER OF NULL GENERATED BY BRIDGED TAP

(75) Inventors: Dong Kwun Kim, Daejeon-Si (KR); Byeong Sook Bae, Daejeon-Si (KR)

(73) Assignee: KT Corporation, Gyeonggi-Do (KR)

( * ) Notice: Subject to any disclaimer, the term of this patent is extended or adjusted under 35 U.S.C. 154(b) by 745 days.

(21) Appl. No.: 10/734,997

(22) Filed: Dec. 12, 2003

(65) Prior Publication Data
US 2004/0125871 A1    Jul. 1, 2004

(30) Foreign Application Priority Data
Dec. 13, 2002   (KR)  ............ 10-2002-0079723

(51) Int. Cl.
*H04B 1/38* (2006.01)

(52) U.S. Cl. .................................... 375/222

(58) Field of Classification Search ............... 375/222, 375/376, 223, 316, 261; 379/406.08
See application file for complete search history.

(56) References Cited

U.S. PATENT DOCUMENTS

| 2003/0035495 A1* | 2/2003 | Laamanen et al. ......... 375/296 |
| 2003/0091111 A1* | 5/2003 | Vaananen ................. 375/231 |

* cited by examiner

*Primary Examiner*—Khai Tran
(74) *Attorney, Agent, or Firm*—Merchant & Gould P.C.

(57) ABSTRACT

A xDSL modem having an adaptive compensating filter of null generated by BT (Bridged Tap) minimizes transmission errors. The VDSL having a null compensating filter comprises a null compensator for finding a null frequency generated on a transfer function of a receiving signal before the DFE by predicting and tracing the null frequency to enlarge a signal component of the null frequency. The damage of a signal component resulting from the null generated by BT on a subscriber line is previously compensated before the equalizer. As a result, degradation of transmission speed of xDSL service is prevented and the number of taps in the equalizer is reduced, thereby reducing cost in embodiment of hardware.

3 Claims, 9 Drawing Sheets

XDSL MODEM HAVING ADAPTIVE COMPENSATING FILTER OF NULL GENERATED BY BRIDGED TAP

BACKGROUND OF THE INVENTION

1. Field of the Invention

The present invention generally relates to a high rate Digital Subscriber Line (xDSL) modem, and more specifically, to a xDSL modem with a Carrierless Amplitude and Phase modulation (hereinafter, abbreviated as "CAP") or Quadrature Amplitude Modulation (hereinafter, abbreviated as "QAM") method which is configured to install a digital filter in front of an equalizer therein, thereby minimizing transmission errors generated by Bridged Tap (hereinafter, abbreviated as "BT") of subscriber lines.

2. Description of the Prior Art

In a digital communication system, a transmission signal is easily distorted by a band-limited channel characteristic while passing through a transmission channel. This distortion is generated by gauss noise, thermal noise, impulse noise, additional or multiple noise due to a fading phenomenon where the strength of a signal varies depending on time, frequency change, non-linearity and temporal dispersion.

Adjacent symbols in the transmission signal are affected by the above-described distortion. This Inter-Symbol Interference (hereinafter, abbreviated as "ISI") is a main cause to degrade performance of the communication system. Specifically, in a QAM system, the ISI is aggravated by multi-level characteristics, which results in obstacle to high-speed data communication.

The equalizer restores the transmission signal distorted by the ISI.

Recently, many researches have been made to solve the ISI. Of these researches, a Decision Feedback Equalizer (hereinafter, abbreviated as "DFE") is proved to have the most excellent performance even in inferior channel conditions.

FIG. 1 illustrates a general structure of a VDSL modem with a conventional QAM or CAP method.

A transmission signal inputted through a channel 1 is distorted by noise n(t) such as additional white noise (AWGN) resulting from channel characteristics. The transmission signal affected by the noise n(t) is converted into a digital signal by an A/D converter 2.

The transmission signal converted by the A/D converter 2 is applied to a feed-forward filter (hereinafter, abbreviated as "FFF") 3 of the DFE comprising a Finite Impulse Response (hereinafter, abbreviated as "FIR") with a predetermined cycle to remove a precursor, and then applied to an adder 4.

The transmission signal, which is outputted from the FFF 3 and applied to the adder 4, is added with an output signal from a Feedback Filter (hereinafter, abbreviated as "FBF") 6, and applied to a signal determiner 5.

The signal determiner 5 receives an output signal from the adder 4 to determine a level of the output signal.

The FBF 6 receives a value determined by the signal determiner 5 to remove a post-cursor of the value, and outputs the value whose post-cursor is removed into the adder 4.

FIG. 2 illustrates a structure of BT where a cable connected in parallel to a transmission channel is disconnected in a VDSL.

The BT generates null on a transfer function of the transmission channel.

A downward signal transmitted from a sending end 7 into a subscriber 8 is bridged in a bridged point B and reflected in a cross-section to be re-added in the bridged point B.

If a length of the BT is d, the transmission signal is transmitted by 2d through the BT. When a wavelength $\lambda$ of a transmission signal satisfies $d=\lambda/4$ or $2d=\lambda/2$, a phase difference of 180° occurs between a transmission signal which is bridged and retraced and a transmission signal which is not bridged. As a result, the two signals cause destructive interference from each other to remove a predetermined signal based on a corresponding frequency.

In other words, a null is generated on a channel transfer function as shown in FIG. 3 in a frequency having the wavelength $\lambda$ four times longer than the BT.

When a speed of a wave is v, the frequency $f_0$ of a first null generated by the BT is expressed as follows.

$$f_0 = v/\lambda = \frac{v}{4d} \qquad \text{[Equation 1]}$$

Since the speed of the wave is determined by a medium, if the speed of light is c and an insulation constant of the medium is $\epsilon_r$, Equation 1 is expressed as follows.

$$f_0 = \frac{v}{4d} = \frac{c}{4d\sqrt{\epsilon_r}} = \frac{K}{d} \qquad \text{[Equation 2]}$$

Also, null is generated in the frequency of multiples of odd numbers of the null frequency $f_0$, that is, in $(2K+1)f_0$. As the length d becomes shorter, the depth of the null becomes deeper, thereby distorting the transmitted signal.

When the length of the channel is l, the channel transfer function of the subscriber line is generally expressed as follows.

$$|H(f)| = e^{-l\alpha(f)} \approx e^{-l\alpha\sqrt{f}} \qquad \text{[Equation 3]}$$

Here, $\alpha(f)$ which represents a reduction constant of the line generally varies in the square root of frequency.

The Equation 3 can be expressed as Equation 4 since l is a reciprocating length 2d of the BT.

$$|H(f)| = e^{-2d\alpha(f)} \approx e^{-2d\alpha\sqrt{f}} \qquad \text{[Equation 4]}$$

Since the first null frequency $f_0=K/d$, the transfer function of the BT in the null frequency $f_0$ can be represented as follows.

$$|H_{bt}(f)| = e^{-(2K\alpha/\sqrt{f_0})} \qquad \text{[Equation 5]}$$

In Equation 5, if $f_0$ becomes larger infinitely, that is, if the length of the BT becomes much shorter, the value of the transfer function of the BT is closer to 1. As a result, the transmission signal from the sending end 7 is remarkably reduced at the BT point B. In other words, the shorter becomes the length of the BT, the larger null is generated in a channel, which results in increase of transmission errors.

In the VDSL with a CAP or QAM method, the distortion on the transfer function is equalized by the DFE as shown in FIG. 1.

However, it is difficult to equalize deep null by a short BT unless the number of taps of the DFE is large. If the number of taps increases in order to solve this problem, the number of shift resistors also increases. As a result, hardware to the DFE becomes complicated, thereby increasing deciding delay time.

In addition, when the depth and width of the null are very large, it is difficult to minimize the transmission errors and to equalize the channel transfer function using the DFE.

SUMMARY OF THE INVENTION

Accordingly, it is an object of the present invention to pre-equalize a channel transfer function before an equalization process of a DFE by predicting null generated by a BT adaptively to compensate a signal component damaged by the null, thereby improving equalization performance.

In an embodiment, a xDSL (high rate Digital Subscriber Line) modem having a DFE (Decision Feedback Equalizer) comprises a null compensator for finding a null frequency generated on a transfer function of a receiving signal before the DFE by predicting and tracing the null frequency to compensate a signal component of the null frequency.

DETAILED DESCRIPTION OF THE PREFERRED EMBODIMENTS

The present invention will be described in detail with reference to the accompanying drawings.

Figure 4:
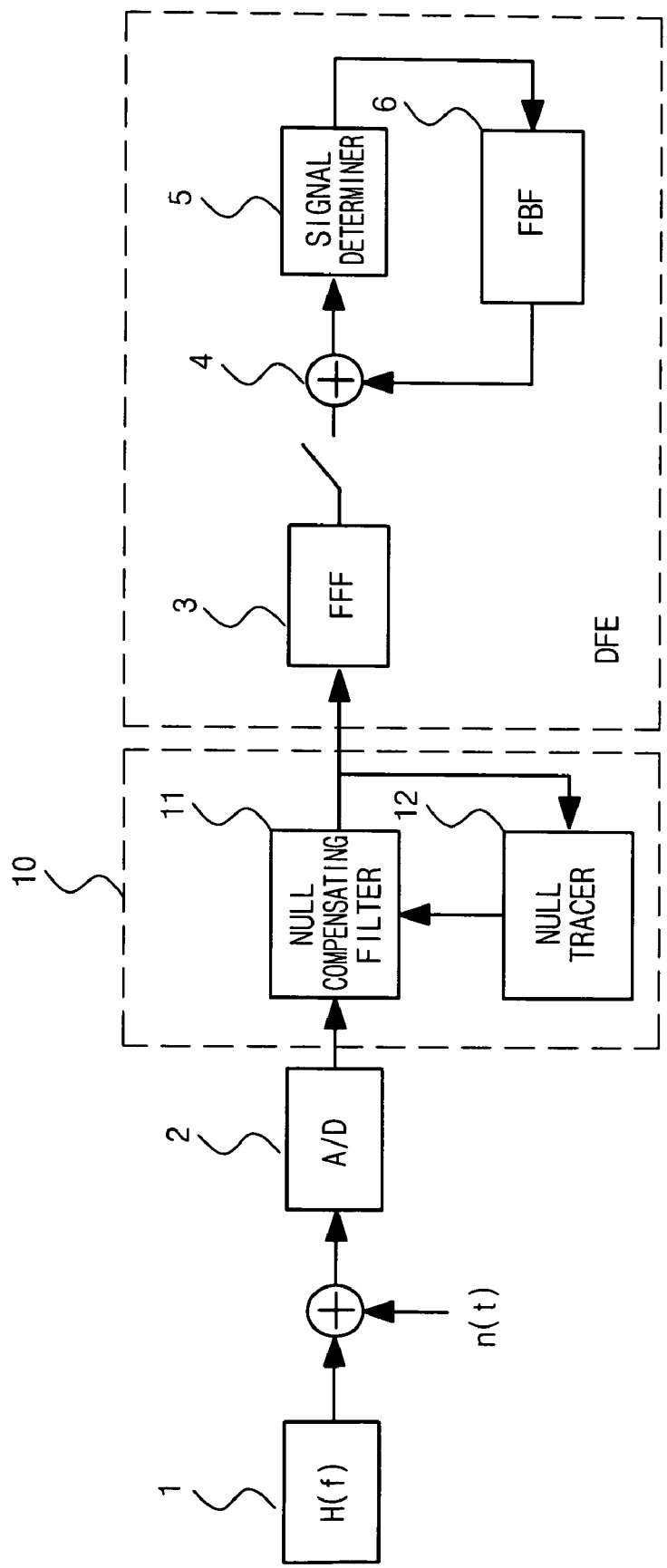
FIG. 4 illustrates a structure of a structure of a VDSL modem according to an embodiment of the present invention.

FIG. 4 illustrates a structure of a VDSL modem according to an embodiment of the present invention.

In an embodiment, a digital subscriber line modem comprises a null compensator 10 for adaptively predicting null generated by BT in a DFE (Decision Feedback Equalizer), tracing a position of the null and compensating a signal component damaged by the null, thereby pre-equalizing a channel transfer function before an equalization process of the DFE.

The null compensator 10 comprises a null compensating filter 11 having a transfer function with an inverse characteristic to the null generated on the channel transfer function by the BT, and a null tracer 12 for tracing a position of the null.

The null compensating filter 11 enlarges a signal component of a null frequency to compensate the null generated on the transfer function of an applied signal channel.

The null compensating filter 11 has a transfer function with an inverse characteristic to a notch filter having a transfer function characteristic with a notch type.

The null tracer 12 traces a position of the null generated on the channel transfer function by the BT depending on null tracing algorithm, thereby fining a null frequency.

Here, the null tracer 12 predicts and traces the null frequency with a RPE (Recursive Prediction Error) algorithm and a Gauss-Newton method.

Figure 1:
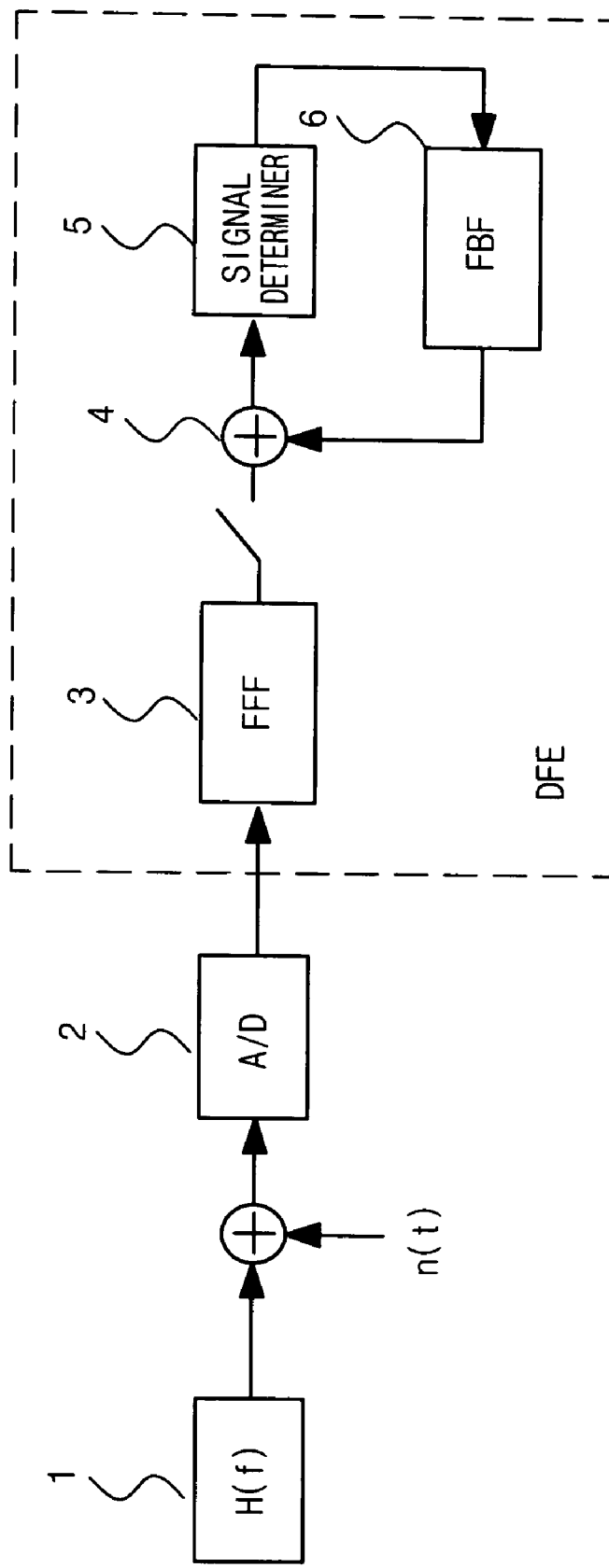
FIG. 1 illustrates a general structure of a VDSL modem with a conventional QAM or CAP method.
Figure 2:
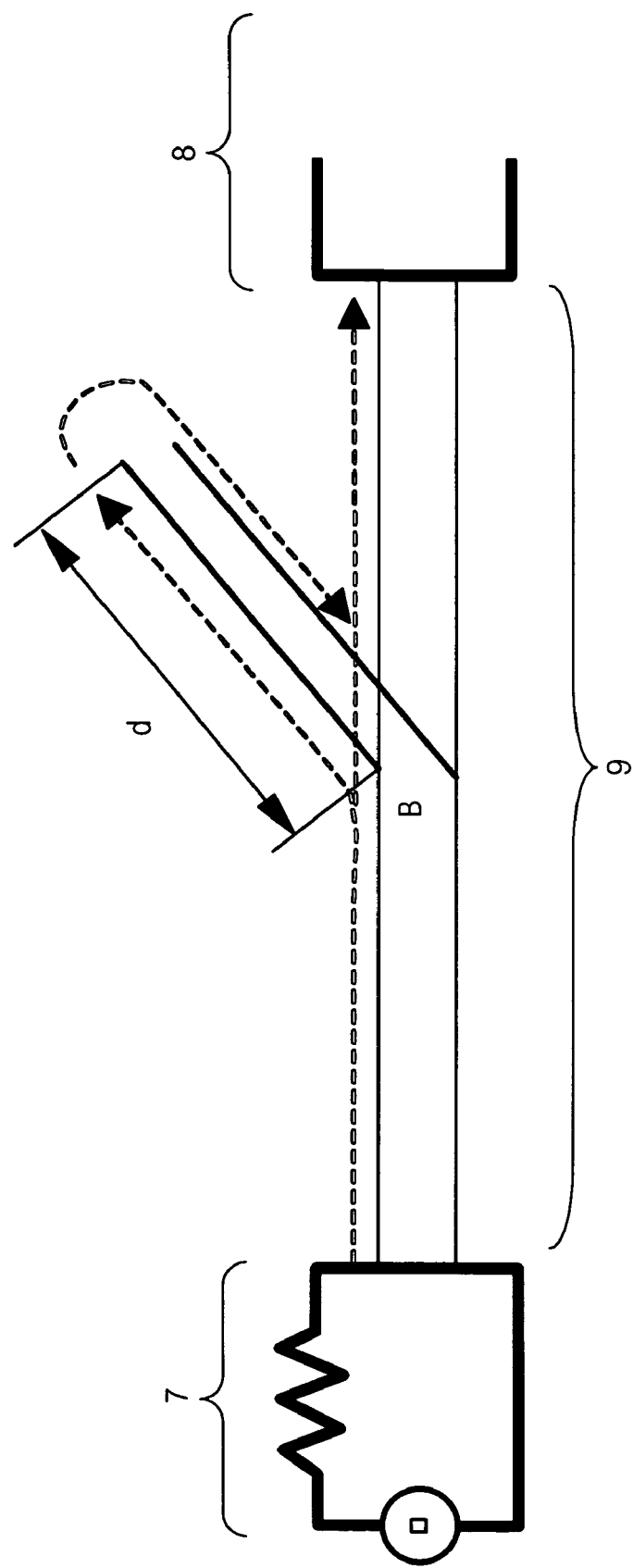
FIG. 2 illustrates a structure of BT where a cable connected in parallel to a transmission channel is disconnected in a VDSL interval.
Figure 3:
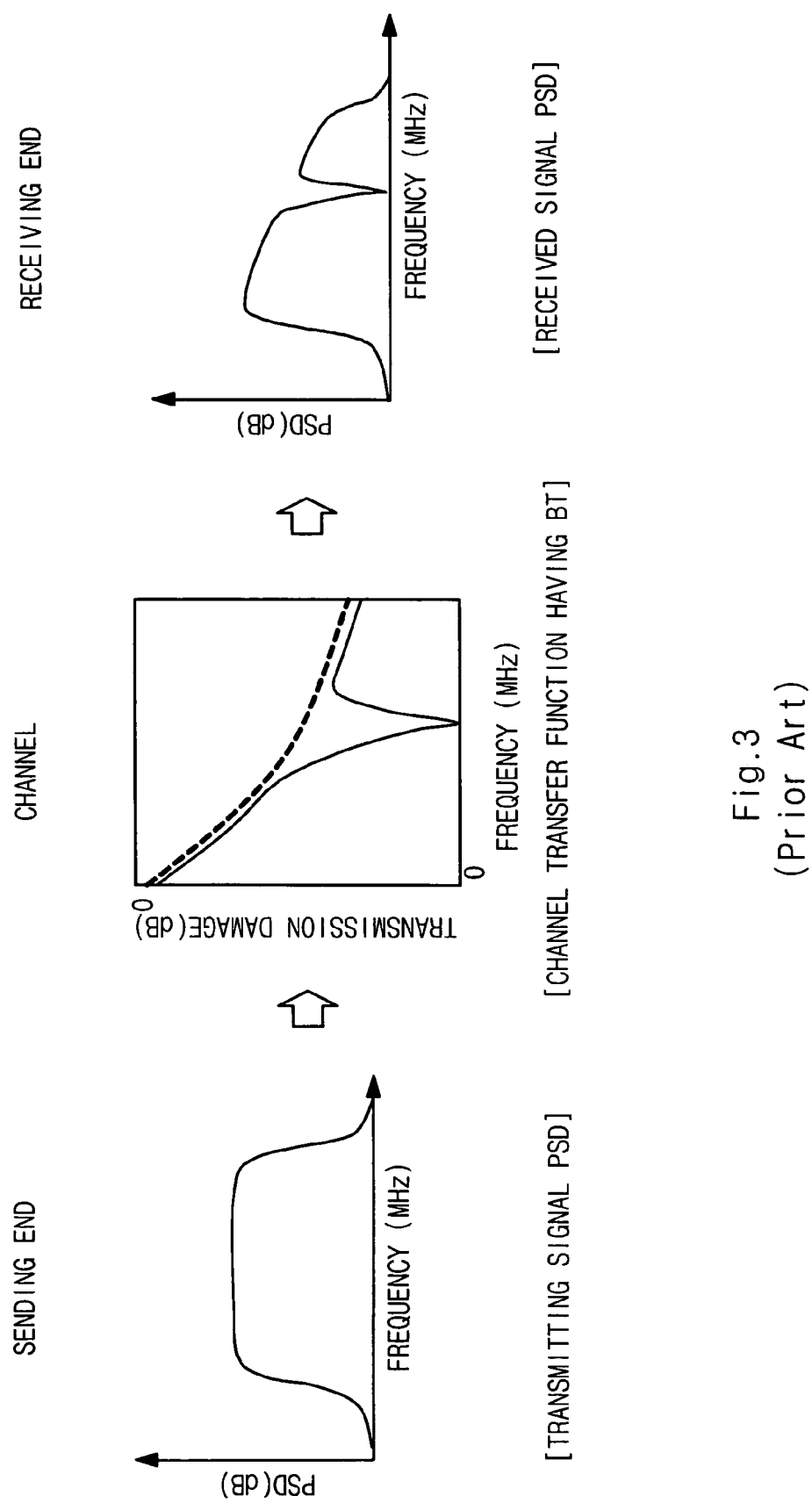
FIG. 3 illustrates generation of null in a transmission signal by a BT on a channel.

The rest elements of FIG. 4 are the same as those of FIG. 1 except the null compensating filter 11 and the null tracer 12.

Since the null compensating filter 11 has a transfer function characteristic of inversion relation with a notch filter having a transfer function characteristic with a notch type, a transfer function of the null compensating filter 11 with an quadratic Infinite Impulse Response (hereinafter, abbreviated as "IIR") type is expressed as follows.

$$H(z^{-1}) = \frac{W(\alpha r z^{-1})}{W(r z^{-1})} \qquad \text{[Equation 6]}$$
$$= \frac{1 - 2\alpha r \cos\theta z^{-1} + \alpha^2 r^2 z^{-2}}{1 - 2r \cos\theta z^{-1} + r^2 z^{-2}}$$
$$= \frac{1 + \alpha r a z^{-1} + \alpha^2 r^2 z^{-2}}{1 + r a z^{-1} + r^2 z^{-2}},$$
$$o < r < 1, 0 < \alpha < 1$$

Here, θ represents a null frequency by radian, r represents a radius of pole, and α represents a zero contraction coefficient. Specifically, the α determines a band width of a corn-shaped spectrum.

Figure 5:
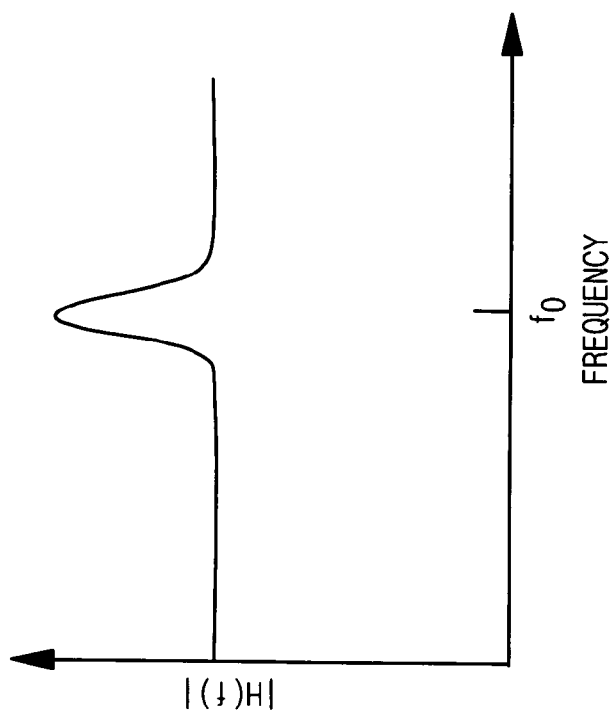
FIG. 5 illustrates a pole-zero diagram and a transfer function of a null compensating filter according to an embodiment of the present invention.
Figure 5:
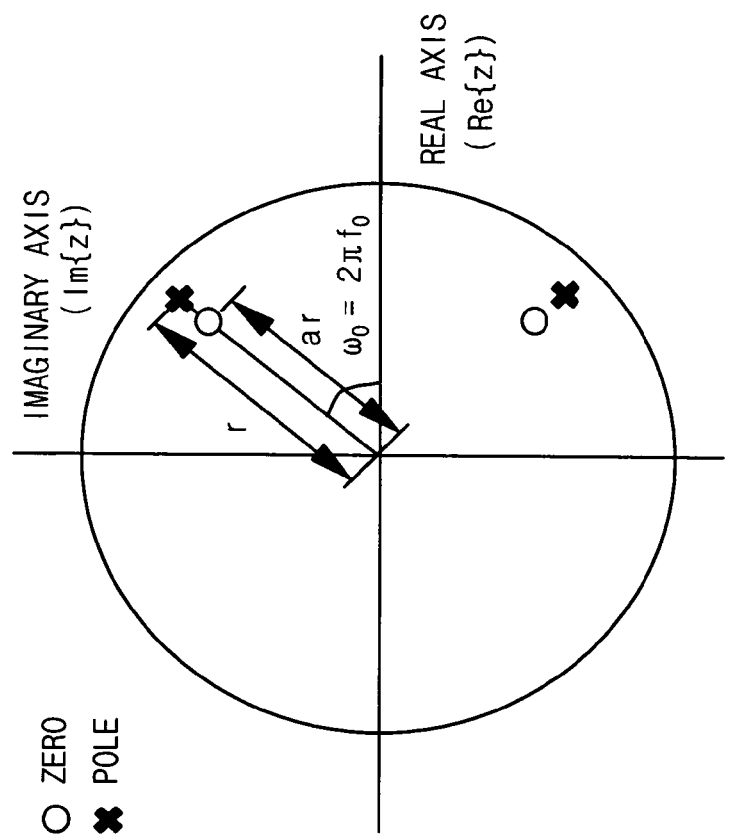

FIG. 5 illustrates a pole-zero diagram and a transfer function of the null compensating filter 11 according to an embodiment of the present invention.

To compensate null on the channel transfer function generated by the BT, a position of the null is adaptively predicted, and a signal component of a corresponding frequency is to be enlarged with a corn-shaped transfer function as shown in FIG. 5.

For this operation, the null tracer 12 predicts the position of the null adaptively with an output power spectrum of the null compensating filter 11.

The adaptive prediction method of the null tracer 12 is as follows.

A basic method of finding a null frequency in the null tracer 12 is to predict a frequency having a minimum average power to an output e(n) of the null compensating filter 11. An error gradient for predicting the frequency is calculated with a RPE algorithm, and a next prediction null frequency is repeatedly updated with a Gauss-Newton method.

If the output of the null compensating filter 11 is e(n), the average power of the output e(n) is expressed as follows.

$$V_N = \frac{1}{N}\sum_{n=1}^{N} e^2(n) \qquad \text{[Equation 7]}$$

Suppose that null is generated on a channel transfer function. When the prediction null frequency of the null compensating filter 11 is $\hat{a}(n) = -2\cos\hat{\theta}(n)$, if the prediction null frequency $\hat{a}(n)$ is different from the actual null frequency, the average power of the null compensating filter 11 increases due to the prediction null frequency $\hat{a}(n)$ by the null compensating filter 11.

On the other hand, as the prediction null frequency $\hat{a}(n)$ is closer to the actual null frequency, the average power of the null compensating filter 11 becomes smaller gradually. When prediction null frequency $\hat{a}(n)$ is identical with the actual null frequency, the average power of the null compensating filter 11 becomes minimized.

Figure 6A:
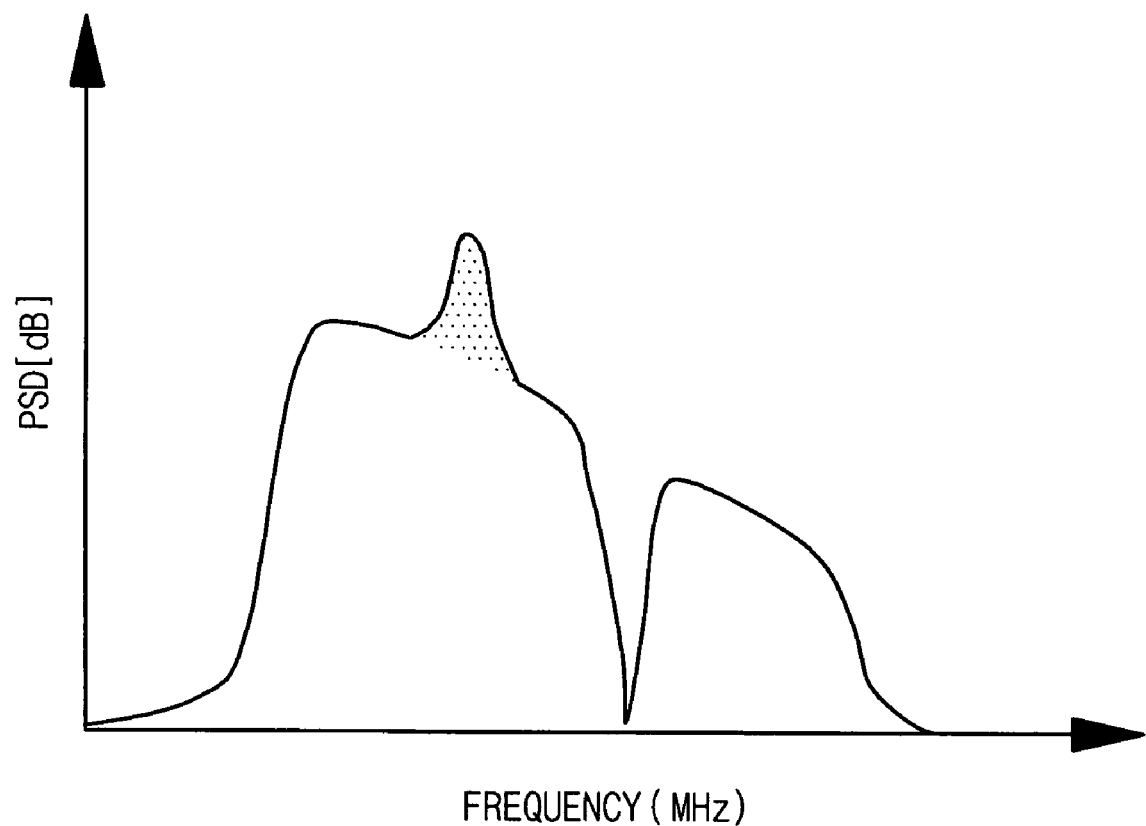
FIGS. 6a to 6c illustrates a power spectrum in trace of the null based on minimum average power of the null compensating filter according to an embodiment of the present invention.
Figure 6B:
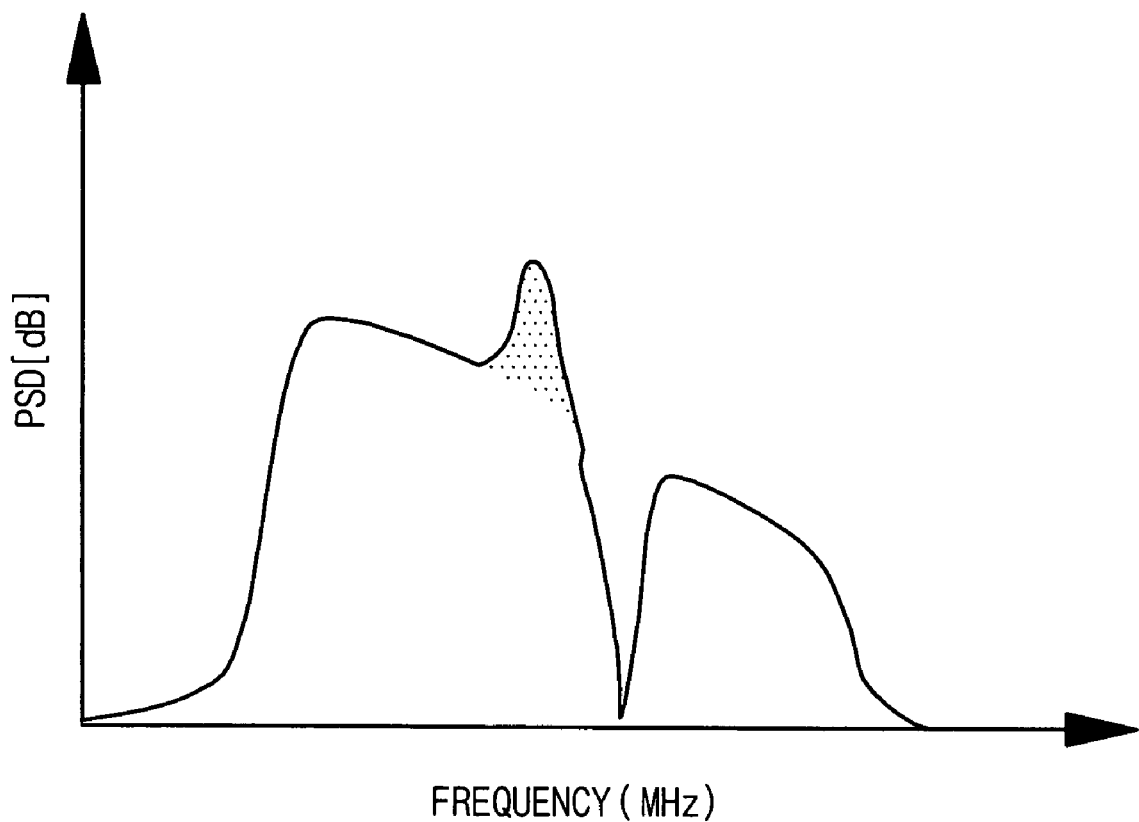
Figure 6C:
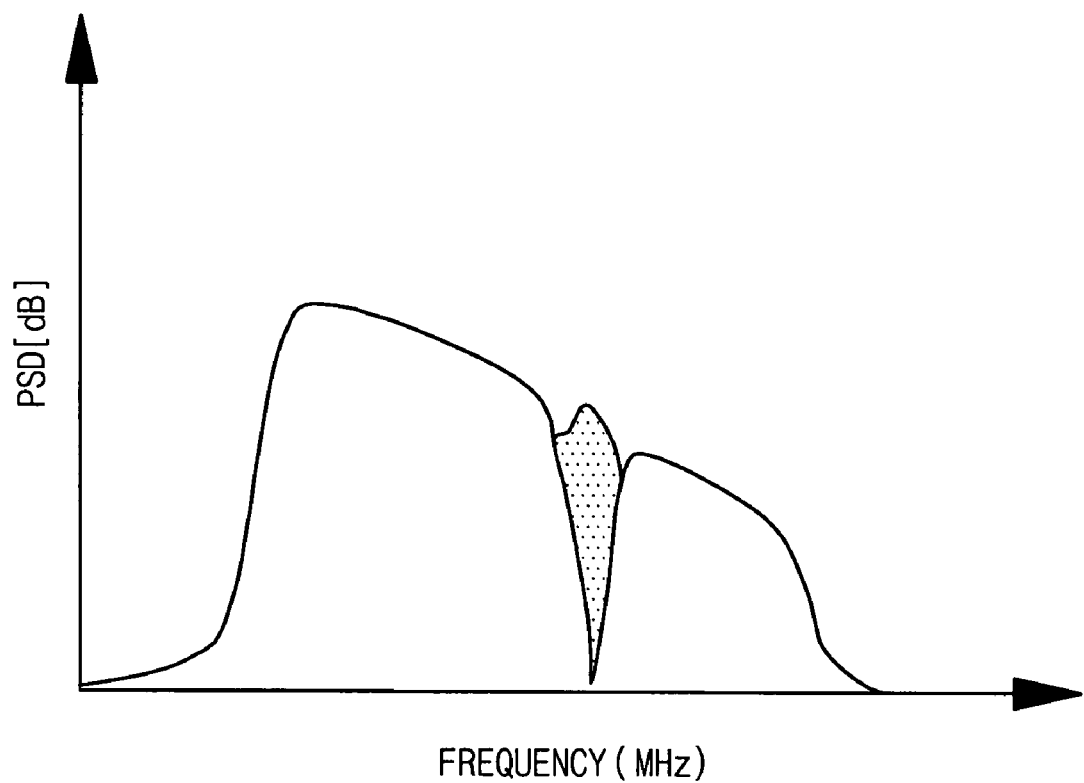

FIGS. 6a to 6c illustrates a power spectrum in trace of the null based on minimum average power of the null compensating filter 11 according to an embodiment of the present invention.

FIGS. 6a and 6b shows a pattern of Power Spectral Density (hereinafter, abbreviated as "PSD") when the position of the null is not found. FIG. 6c shows a pattern of PSD when the position of the null is exactly found to strengthen the signal component of the corresponding frequency.

The average power is the same as integral calculus $$\left(\int_{-\infty}^{\infty} PSD\, df\right)$$

of PSD as shown in FIG. 6. As a result, as the area of PSD becomes larger, the average power increases.

Equation 6, the transfer function of the null compensating filter 11, is expressed as follow by $\alpha r = \delta$.

$$H(z^{-1}) = \frac{W(\delta z^{-1})}{W(rz^{-1})} \qquad \text{[Equation 8]}$$
$$= \frac{1 - 2\delta\cos\theta z^{-1} + \delta^2 z^{-2}}{1 - 2r\cos\theta z^{-1} + r^2 z^{-2}}$$
$$= \frac{1 + \delta a z^{-1} + \delta^2 z^{-2}}{1 + r a z^{-1} + r^2 z^{-2}},$$

$$o < r < 1, o < \delta < 1$$

If a transmission signal inputted into the null compensating filter 11 after sampled consecutively in an A/D converter 2 is y(n), the output e(n) of the null compensating filter 11 having the above-described transfer function characteristic is expressed as follows.

$$e(n) = H(n, q^{-1})y(n) = \frac{1 + \delta\hat{a}(n)q^{-1} + \delta^2 q^{-2}}{1 + r\hat{a}(n)q^{-1} + r^2 q^{-2}} y(n) \qquad \text{[Equation 9]}$$

Here, $q^{-1}$ represents a unit delay operator.

Equation 9 can be expressed with a difference equation type as follows.

$$W(rq^{-1})e(n) = W(\delta q^{-1})y(n) \qquad \text{[Equation 10]}$$

$$(1 + raq^{-1} + r^2 q^{-2})e(n) = (1 + \delta\alpha q^{-1} + \delta^2 q^{-2})y(n) \qquad \text{[Equation 11]}$$

$$e(n) + rae(n-1) + r^2 e(n-2) = y(n) + \delta\alpha y(n-1) + \delta^2 y(n-2) \qquad \text{[Equation 12]}$$

$$e(n) = -rae(n-1) - r^2 e(n-2) + y(n) + \delta\alpha y(n-1) + \delta^2 y(n-2) \qquad \text{[Equation 13]}$$

Here, Equation 10 differentiated to the frequency a can be expressed as follows.

$$W(rq^{-1})\frac{\partial e(n)}{\partial a} + \frac{\partial W(rq^{-1})}{\partial a}e(n) = \qquad \text{[Equation 14]}$$
$$W(\delta q^{-1})\frac{\partial y(n)}{\partial a} + \frac{\partial W(\delta q^{-1})}{\partial a}y(n)$$

$$W(rq^{-1})\frac{\partial e(n)}{\partial a} + (rq^{-1})e(n) = W(\delta q^{-1})\frac{\partial y(n)}{\partial a} + (\delta q^{-1})y(n) \qquad \text{[Equation 15]}$$

$$W(rq^{-1})\frac{\partial e(n)}{\partial a} + re(n-1) = \delta y(n-1) \qquad \text{[Equation 16]}$$

$$W(rq^{-1})\frac{\partial e(n)}{\partial a} = \delta y(n-1) - re(n-1) \qquad \text{[Equation 17]}$$

In Equation 15, since the input data y(n) has no relation with the frequency $\alpha$, $$\frac{\partial y(n)}{\partial a} = 0.$$

In order to reduce the output of the null compensating filter 11 or decrease difference between the output of the null compensating filter 11 and prediction error, the next prediction null frequency $\hat{a}(n+1)$ to the initial prediction null frequency $\hat{a}(n)$ is required to move in a minus direction to $$\frac{\partial e(n)}{\partial a}.$$

Figure 7:
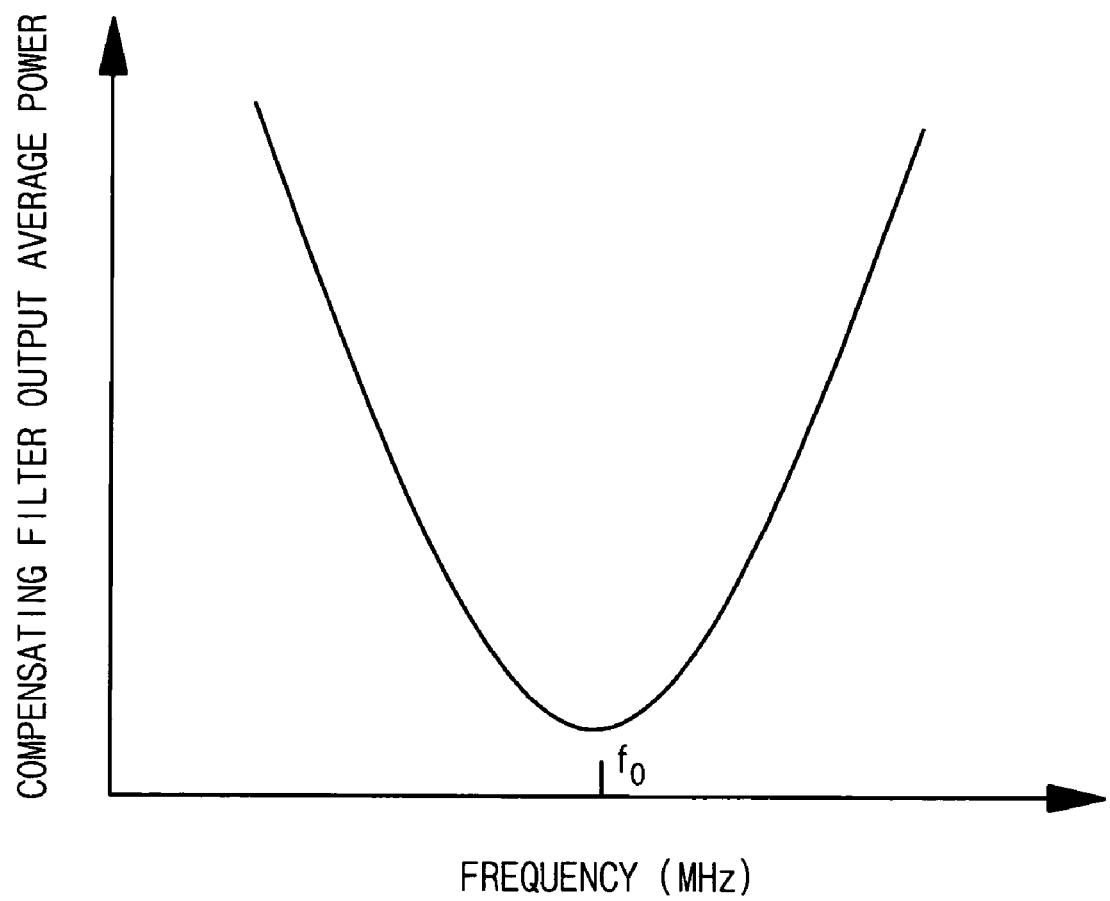
FIG. 7 illustrates the change of average power of null compensating filter output depending on a predicting null frequency.

Referring to FIG. 7, when the average power of the null compensating filter 11 having a quadratic function type has the only one minimum point, the next prediction null frequency $\hat{a}(n+1)$ is required to move in a minus direction to $$\frac{\partial e(n)}{\partial a}$$

so that the next prediction null frequency $\hat{a}(n+1)$ may move toward the minimum point ($f_o$) of the average power.

If a minus prediction error gradient is defined as $\psi(n)$, $\psi(n)$ can be expressed as follows.

$$\psi(n) = -\frac{\partial e(n)}{\partial a}\bigg|_{a=\hat{a}(n)} \qquad \text{[Equation 18]}$$

Equation 17 is substituted in Equation 18 to obtain Equation 19.

$$\psi(n) = -\frac{\partial e(n)}{\partial a}\bigg|_{a=\hat{a}(n)} \qquad \text{[Equation 19]}$$

-continued $$= \frac{-\delta y(n-1) + \text{re}(n-1)}{W(rq^{-1})}$$

$$= \frac{-\delta y(n-1) + \text{re}(n-1)}{1 + raq^{-1} + r^2 q^{-2}}$$

If the current prediction frequency is â(n) and the next prediction null frequency is â(n+1), the next prediction null frequency â(n+1) according to the Gauss-Newton method is updated as shown in Equation 20.

$$â(n+1) = â(n) + (1-\rho)R(n)^{-1}\psi(n)e(n) \quad \text{[Equation 20]}$$

Here, (1−ρ) as a parameter identical with a step size representing in a repeatedly updated equation limits a maximum fluctuation width of the prediction null frequency â. The value of (1−ρ) is determined at random depending on sensitivity to prediction capability of the modem and noise.

To reduce dispersion of the prediction null frequency â, it is preferable that the value of (1−ρ) is smaller. If the value of (1−ρ) is very small, a convergence time to fine a position of the null becomes longer. However, since the position of the null generated by the BT is not change depending on time, rapid trace depending on time change is not required. Therefore, it is preferable that the value of (1−ρ) is small if possible.

R(n) represents a sum of square second-derivative, which is generally known for a "Gauss-Newton direction". The Gauss-Newton direction is represented as follows.

$$R(n) = R(n-1) + (1-\rho)(\psi(n)^2 - R(n-1)) \quad \text{[Equation 21]}$$

The output e(n) of the null compensating filter 11 is actually embodied using Equation 13 instead of Equation 9.

As shown in FIG. 7, since there is the only one minimum point of the average power in the whole range of the prediction null frequency, the prediction null frequency of the null compensating filter 11 is converged in the actual null frequency. As a result, the damage of the signal component due to the null can be compensated.

The transmission signal compensated by the null compensating filter 11 is applied to the FFF 3 of the DFE. The subsequent process is identical with the conventional process of the DFE.

As described above, in a VDSL modem having a null compensator according to an embodiment of the present invention, damage of a signal component resulting from null generated by BT on a subscriber line is previously compensated before an equalizer. As a result, our invention enable the VDSL system to prevent degradation of transmission speed of high speed Internet services and to reduce the number of taps of DFE, and thereby to reduce hardware cost.

What is claimed is:

1. An xDSL (Very high rate Digital Subscriber Line) modem comprising: a null compensator for finding a null frequency generated on a transfer function of a receiving signal before the DFE by predicting and tracing the null frequency to enlarge a signal component of the null frequency, wherein the null compensator comprises:
   a null compensating filter for enlarging the signal component corresponding to the null frequency on the transfer function of the receiving signal; and
   a null tracer for tracing the null frequency using minimum point of a average power or an output energy of the null compensating filter.

2. The xDSL according to claim 1, wherein the null compensating filter has a transfer function with an inverse characteristic to a notch filter having a transfer function characteristic with a notch type.

3. The xDSL according to claim 1, wherein the null tracer predicts and traces the null frequency with a RPE (Recursive Prediction Error) algorithm and a Gauss-Newton method.

\* \* \* \* \*